(12) United States Patent
Belleville et al.

(10) Patent No.: US 12,540,772 B2
(45) Date of Patent: Feb. 3, 2026

(54) SYSTEM FOR GENERATING AN INERT GAS FOR AN AIRCRAFT USING LIQUID HYDROGEN

(71) Applicant: Airbus Operations SAS, Toulouse (FR)

(72) Inventors: Mathieu Belleville, Toulouse (FR); Théophile Horde, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 315 days.

(21) Appl. No.: 17/972,901

(22) Filed: Oct. 25, 2022

(65) Prior Publication Data

US 2023/0160631 A1 May 25, 2023

(30) Foreign Application Priority Data

Oct. 27, 2021 (FR) .................................. FR2111432

(51) Int. Cl.
*F25J 1/00* (2006.01)

(52) U.S. Cl.
CPC .............. *F25J 1/004* (2013.01); *F25J 1/0015* (2013.01); *F25J 1/0027* (2013.01); *F25J 1/0067* (2013.01); *F25J 2210/40* (2013.01)

(58) Field of Classification Search
CPC ........ A62C 3/08; F25J 2210/40; F25J 1/0067; F25J 3/04636; F25J 3/04993; F25J 2290/70; B64D 37/32
See application file for complete search history.

(56) References Cited

U.S. PATENT DOCUMENTS

| | | |
|---|---|---|
| 5,154,051 A | 10/1992 | Mouritzen |
| 5,305,610 A | 4/1994 | Bennett et al. |
| 2011/0100055 A1 * | 5/2011 | Brigham .............. F25J 3/04296 62/643 |
| 2016/0178129 A1 | 6/2016 | Chen et al. |
| 2016/0201983 A1 * | 7/2016 | Sharma .................. F25J 1/0204 95/47 |
| 2018/0080379 A1 * | 3/2018 | Conlon .................. F25J 1/0045 |

FOREIGN PATENT DOCUMENTS

| | | | |
|---|---|---|---|
| DE | 4016897 C1 * | 5/1990 | ............. F25J 3/0426 |
| GB | 2359876 A | 9/2001 | |
| JP | H01309899 A | 12/1989 | |
| KR | 20100130805 A * | 6/2009 | ............. C01B 32/50 |

OTHER PUBLICATIONS

French Search Report dated Jul. 7, 2022; priority document.

* cited by examiner

*Primary Examiner* — Jianying C Atkisson
(74) *Attorney, Agent, or Firm* — Greer, Burns & Crain, Ltd.

(57) ABSTRACT

A system for generating an inert fluid, the system being carried on board an aircraft, the generation system including a plurality of devices configured each, in succession, to execute a separation of components of a primary fluid initially collected in the form of compressed hot air, the system including at least one heat exchanger configured to execute a separation of components, by change of phase of a component of the primary fluid, executing a cooling of the primary fluid using liquid hydrogen, supplied with liquid hydrogen collected from a tank of the aircraft. It is thus possible to generate an inert gas without requiring membrane separation of the nitrogen and the oxygen, and while at the same time making it easier to warm the liquid hydrogen stored and used in the aircraft as a source of energy.

6 Claims, 11 Drawing Sheets

SYSTEM FOR GENERATING AN INERT GAS FOR AN AIRCRAFT USING LIQUID HYDROGEN

CROSS-REFERENCES TO RELATED APPLICATIONS

This application claims the benefit of the French patent application No. 2111432 filed on Oct. 27, 2021, the entire disclosures of which are incorporated herein by way of reference.

FIELD OF THE INVENTION

The present invention relates to a method for generating an inert gas for use in an aircraft and to a system carried on board an aircraft and configured to implement this method. The invention more specifically relates to a method for generating an inert gas executing fractional distillation of compressed air in the aircraft, in order to be obtain the inert gas, in an aircraft using liquid hydrogen as an energy source, and to a system executing this method and carried on board an aircraft.

BACKGROUND OF THE INVENTION

Liquid hydrogen (or more accurately liquid dihydrogen of formula H2) is a cryogenic fluid that can be used as an energy source for producing electricity. Thus, for example, it is possible to use a hydrogen fuel cell to power all of the flight control and communications systems of an aircraft, and for the lighting onboard the aircraft and for powering various accessories used in the aircraft. The liquid hydrogen may also act as a power source for the propulsion of an aircraft, by being supplied to a fuel cell or else by direct combustion, which offers the advantage that only water is discharged into the atmosphere. The hydrogen stored in liquid form in a tank of the aircraft needs to be warmed in order to be used in this way. Furthermore, when the liquid hydrogen is used as a fuel, an inert gas is used for removing the gaseous hydrogen present in certain parts of the fuel system, in order to avoid the risks of fire and explosion, particularly during phases of starting or shutting down the aircraft engines. The inert gas is generally nitrogen, obtained by isolating it from the other components of air collected from outside the aircraft. The separation of the nitrogen from the other components of the air is performed using one or more membranes in a system referred to as an "inerting" system. The membrane or membranes used thus make it possible to obtain nitrogen from the air around the aircraft. However, these membranes are susceptible to air contamination.

The situation has room for improvement.

SUMMARY OF THE INVENTION

In the present description, a dihydrogen fluid is referred to as "hydrogen" according to common parlance.

It is an object of the present invention to propose an inerting system that does not require membrane separation of the nitrogen and the oxygen while at the same time making it easier to warm the liquid hydrogen stored and used in the aircraft as a source of energy.

To this end, what is proposed is a method for generating an inert fluid, the method being performed in an aircraft, the inert fluid being obtained by successive separations of components of a primary fluid initially collected in the form of compressed hot air, the method comprising at least a separation of components by change of phase of one component of the primary fluid, using a heat exchanger configured to execute a cooling of the primary fluid using liquid hydrogen and fed with liquid hydrogen collected from a tank of the aircraft.

Advantageously, it is thus possible to execute judicious warming of the liquid hydrogen so that it can be used on board the aircraft, while at the same time using it as a coolant through one or more heat exchangers in order to perform fractional distillation of a compressed air, and ultimately generating inert gas.

Advantageously, the inert gas can then be used to remove gaseous hydrogen from certain parts of the aircraft fuel system.

The method for generating an inert fluid according to the invention may also comprise the following features, considered alone or in combination:

- The method comprises a first step of separating components of the primary fluid, by cooling the primary fluid, suitable for extracting water from the primary fluid, and a second step of separating components of the primary fluid, by cooling the primary fluid, suitable for extracting carbon dioxide from the primary fluid.
- The method comprises a third step of separating components of the primary fluid, by cooling the primary fluid, after the first step and second step and suitable for extracting dioxygen from the primary fluid, in liquid form.
- The method comprises a step of liquefying the primary fluid, after the first step, second step and third step of separating components, and followed by a step of pumping the primary fluid into a tank, in the form of liquid nitrogen.
- The method further comprises a step of liquefying the primary fluid, after the first step and second step and followed by a step of warming the liquefied primary fluid, suitable for extracting nitrogen in gaseous form from the primary fluid.
- The successive steps of separating components of the primary fluid, by cooling the primary fluid, each use a heat exchanger, the heat exchangers used being fed in parallel, each via a motorized valve from a liquid-hydrogen tank of the aircraft.
- Successive steps of separating components of the primary fluid, by cooling the primary fluid, each use a heat exchanger, the heat exchangers being arranged in series so that the liquid hydrogen used at the inlet of a heat exchanger for cooling the primary fluid during a component-separating step comes at least in part from an outlet of another heat exchanger used for cooling the primary fluid in another step of separating components of the primary fluid.
- The first step of separating components of the primary fluid comprises a cooling of the primary fluid in a heat exchanger using ambient air, the second step of separating components of the primary fluid comprises a cooling of the primary fluid in a heat exchanger by means of the liquid-form dioxygen extracted during the third step, and the third step of extracting dioxygen in liquid form comprises a cooling of the primary fluid using liquid nitrogen taken from the liquid-nitrogen tank.
- The method further comprises a step of liquefying the primary fluid, after the first step and second step, wherein the first step and second step of separating components of the primary fluid each comprise a cooling of the primary fluid in a heat exchanger by means of the liquefied primary fluid, and wherein the step of liquefying the primary fluid comprises a cooling of the primary fluid in a heat exchanger by means of the liquid hydrogen.

Another subject of the invention is a system for generating an inert fluid, the system being carried on board an aircraft, the generation system comprising a plurality of devices configured each, in succession, to execute a separation of components of a primary fluid initially collected in the form of compressed hot air, the system comprising at least one heat exchanger configured to execute a separation of components, by change of phase of a component of the primary fluid, the heat exchanger executing a cooling of the primary fluid using liquid hydrogen, being supplied with liquid hydrogen collected from a tank of the aircraft.

Another subject of the invention is an aircraft comprising a system for generating an inert fluid as hereinabove or comprising an inert-fluid generation system configured to execute an inert-gas generation method as described hereinabove.

BRIEF DESCRIPTION OF THE DRAWINGS

The abovementioned features of the invention, together with others, will become more clearly apparent from reading the following description of one exemplary embodiment, the description being given in connection with the attached drawings, among which:

FIG. 1b is a diagram illustrating an inert-gas generation method executed in the system depicted in FIG. 1a;

FIG. 2a is a block diagram illustrating a first variant of the inert-gas generation system carried on board an aircraft, depicted in FIG. 1a;

FIG. 2b is a diagram illustrating an inert-gas generation method executed in the system depicted in FIG. 2a;

FIG. 3a is a block diagram illustrating a second variant of the inert-gas generation system carried on board an aircraft, depicted in FIG. 1a;

FIG. 3b is a diagram illustrating an inert-gas generation method executed in the system depicted in FIG. 3a;

FIG. 4a is a block diagram illustrating a third variant of the inert-gas generation system carried on board an aircraft, depicted in FIG. 1a;

FIG. 4b is a diagram illustrating an inert-gas generation method executed in the system depicted in FIG. 4a;

FIG. 5a is a block diagram illustrating a fourth variant of the inert-gas generation system carried on board an aircraft, depicted in FIG. 1a;

FIG. 5b is a diagram illustrating an inert-gas generation method executed in the system depicted in FIG. 5a; and, FIG. 6 illustrates an aircraft comprising an inert-gas generation system as already illustrated in one of figures FIG. 1a, FIG. 2a, FIG. 3a, FIG. 4a, and FIG. 5a.

DETAILED DESCRIPTION OF THE PREFERRED EMBODIMENTS

Figure 1A:
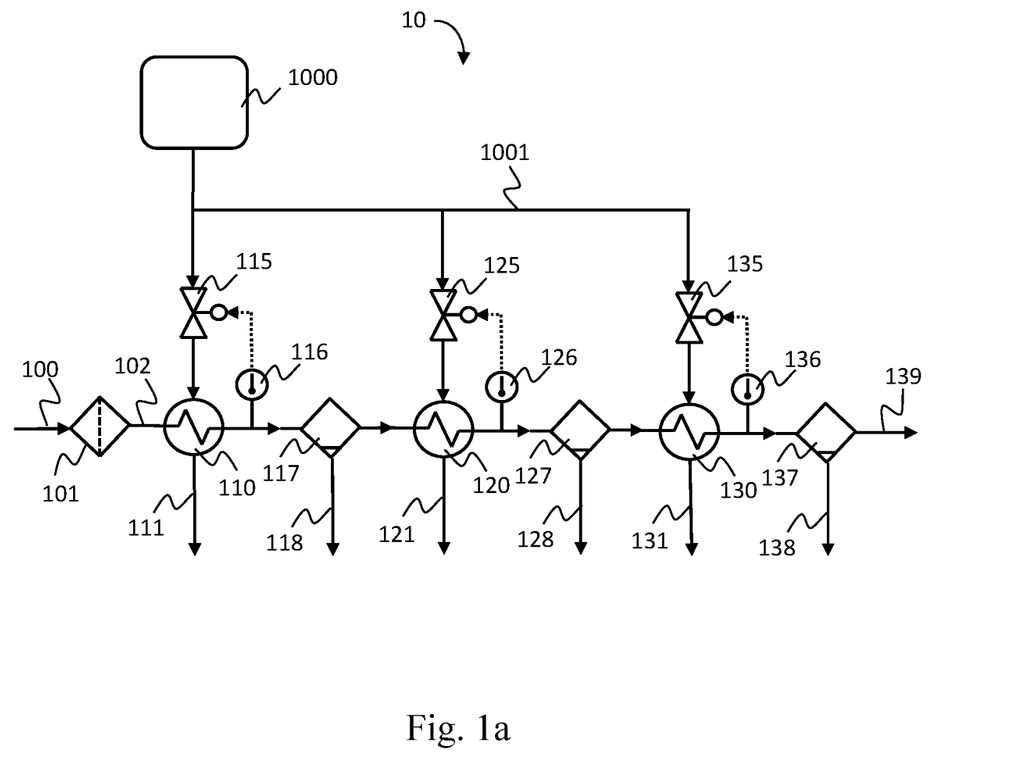
FIG. 1a is a block diagram illustrating an inert-gas generation system carried on board an aircraft, according to one embodiment.

FIG. 1a schematically depicts an inert-gas generation system 10, referred to as an inerting system, configured to generate nitrogen, which is an inert gas, from compressed air, in an aircraft using liquid hydrogen as a power source and according to one embodiment. The system 10 comprises a liquid-hydrogen tank 1000 to which there is connected a tank-outlet pipeline 1001 intended for distributing liquid hydrogen to various points of the inert-gas generation system 10. The liquid hydrogen is used as a refrigerant in the system 10 to cool compressed air and execute fractional distillation of this compressed air with a view to obtaining nitrogen. In the present description, the use of the term "downstream" refers to a relative position whereby one element is further away from the source of a fluid than is another element, as opposed to the term "upstream" which refers to a relative position whereby one element is closer to the source of a fluid than is another element. Thus, by way of example, the inlet of a system operating on a fluid constitutes the most "upstream" element of the system and the outlet of this system constitutes an element "downstream" of the inlet. Similarly, a tank of a fluid feeding a system that handles or uses this fluid is situated "upstream" of the elements of this system, with respect to the path that the fluid flows along and the elements through which the fluid passes are situated "downstream" of this tank.

The inert-gas generation system 10 comprises a compressed-air inlet 100 via which compressed air at a pressure greater than or equal to 6 bar is introduced. The compressed air introduced into the inert-gas generation system 10 comes from one or more engines of the aircraft carrying the inert-gas generation system 10. The compressed-air inlet 100 is connected to an inlet filter 101 configured to hold back impurities in the air taken from the engine or engines and prevent these impurities from being able to enter the inert-gas generation system 10. The outlet of the inlet filter 101 is connected to a pipeline 102 which passes in succession through equipment for separating components of the fluid passing through it. In the present description, the term "primary fluid" is given to the fluid passing through the pipeline 102 and which is initially compressed air at the inlet 100 of the pipeline 102, and the term "primary pipeline" is given to the pipeline 102 or the portions of pipeline 102 associated with the various pieces of equipment through which it passes. The primary fluid therefore changes as it gradually passes along the pipeline 102 because components of this fluid are successively extracted therefrom during successive steps of fractional distillation, as the fluid gradually passes through the equipment. The pipeline 102 comprises, in succession, between the inlet filter 101 and an inert-gas outlet 139, a pipeline portion in a first heat exchanger 110, a pipeline portion in a first purge device 117, a pipeline portion in a second heat exchanger 120, a pipeline portion in a second purge device 127, a pipeline portion in a third heat exchanger 130 and a pipeline portion in a third purge device 137. These devices are configured to execute fractional distillation of the compressed air introduced via the inlet 100 of the inert-gas generation system 10. The pipeline 102 is therefore arranged in such a way that:

the outlet of the inlet filter 101 is connected to the inlet of the portion of pipeline 102 associated with the heat exchanger 110, the outlet of the portion of pipeline 102 associated with the heat exchanger 110 is connected to the inlet of the purge device 117, or more specifically to the inlet of the portion of pipeline 102 associated with the purge device 117, the outlet of the portion of pipeline 102 associated with the purge device 117 is connected to the inlet of portion of pipeline 102 associated with the heat exchanger 120, the outlet of the heat exchanger 120 is connected to the inlet of the purge device 127, or more precisely to the inlet of the portion of pipeline 102 associated with the purge device 127, the outlet of the portion of pipeline 102 associated with the purge device 127 is connected to the inlet of the portion of pipeline 102 associated with the heat exchanger 130, the outlet of the portion of pipeline 102 associated with the heat exchanger 130 is connected to the inlet of the purge device 137, or more specifically to the inlet of the portion of pipeline 102 associated with the purge device 137, the outlet of the purge device 137 is connected to the outlet 139 of the inert-gas generation system 10.

Each of the heat exchangers 110, 120 and 130 comprises a portion of the pipeline 102, referred to as the primary pipeline, through which the primary fluid passes, and a portion of another pipeline, referred to as the secondary pipeline, used for executing an exchange of heat with the portion of pipeline 102 that passes through it. Thus, the heat exchanger 110 comprises a secondary pipeline, in the form of one or more chambers through which the portion of pipeline 102 it comprises passes through, so as to execute an exchange of heat. The same is true of the heat exchanger 120 which comprises a secondary pipeline, in the form of one or more chambers through which the portion of pipeline 102 that it comprises passes through with a view to executing an exchange of heat. The heat exchanger 130 again likewise comprises a secondary pipeline, in the form of one or more chambers through which the portion of pipeline 102 that it comprises passes through, with a view to executing an exchange of heat.

The secondary-pipeline inlet of each of the heat exchangers 110, 120 and 130 is connected to the outlet of a motorized valve, and the inlet of each of these motorized valves is connected to the pipeline 1001 used for distributing liquid hydrogen from a liquid-hydrogen tank 1000. The liquid hydrogen is kept at a storage temperature of around 20K in the liquid-hydrogen storage tank 1000. Thus, there is a motorized valve 115 between the pipeline 1001 and the secondary-pipeline inlet of the heat exchanger 110, to control the distribution of liquid hydrogen taken from the tank 1000 to the secondary pipeline of the exchanger 110 and to cool the portion of primary pipeline 102 in the heat exchanger 110. Similarly, there is a motorized valve 125 between the pipeline 1001 and the secondary-pipeline inlet of the heat exchanger 120, so as to control the distribution of liquid hydrogen taken from the tank 1000 into the secondary pipeline of the exchanger 120 and to cool the portion of primary pipeline 102, in the heat exchanger 120. Similarly again, there is a motorized valve 135 between the pipeline 1001 and the secondary-pipeline inlet of the heat exchanger 130, so as to control the distribution of liquid hydrogen taken from the tank 1000 into the secondary pipeline of the exchanger 130 and cool the portion of primary pipeline 102, in the heat exchanger 130. Each outlet of a portion of the primary pipeline 102 associated with a heat exchanger from among the heat exchangers 110, 120 and 130 is equipped with a device for measuring the temperature of the primary fluid at the outlet of the exchanger, so as to measure the temperature of the primary fluid at the outlet of the portion of primary pipeline 102 associated with that exchanger and so as to control the motorized valve situated at the inlet of the secondary pipeline of that same exchanger in order to achieve feedback control of the cooling executed in the heat exchanger using the liquid hydrogen stored in the liquid-hydrogen tank 1000. Thus, the outlet of the primary pipe 102 associated with the heat exchanger 110 comprises a device 116 for measuring the temperature of the primary fluid in the pipeline 102, the outlet of the primary pipe 102 associated with the heat exchanger 120 comprises a device 126 for measuring the temperature of the primary fluid in the pipeline 102, and the outlet of the primary pipe 102 associated with the heat exchanger 130 comprises a device 136 for measuring the temperature of the primary fluid in the pipeline 102. The opening of the motorized valve 115 is therefore controlled as a function of the primary-fluid temperature measured by the temperature-measurement device 116. The same is true of the openings of the motorized valves 125 and 135 which are respectively controlled as a function of the temperatures measured by the temperature-measuring devices 126 and 136. According to one embodiment, a control unit (not depicted in FIG. 1*a*) controlling the motorized valves controls all of the motorized valves. In a variant, each of the motorized valves has its own control unit controlling its opening. What is meant here by the opening of a valve is a degree of opening, so that control of the opening of a valve implies operations of opening or of closing the valve using the motor coupled to a shut-off element that shuts off the pipeline internal to the valve (a gate, for example). Each of the heat exchangers 110, 120 and 130 comprises a secondary-pipeline outlet via which the liquid hydrogen passes as it leaves the secondary chamber or chambers of the heat exchanger. Thus, the heat exchanger 110 comprises a secondary-pipeline outlet 111, the heat exchanger 120 comprises a secondary-pipeline outlet 121 and the heat exchanger 130 comprises a secondary-pipeline outlet 131. According to one embodiment, the secondary-pipeline outlets 111, 121 and 131 of the exchangers are connected to hydrogen-using installations in the aircraft, such as, by way of example, one or more fuel cells. According to one embodiment, the control unit controlling the motorized valve 115 is configured to obtain a temperature lower than 430K at the measurement point of the primary-fluid temperature-measurement device 116, so that the water contained in the primary fluid can be separated from the primary fluid using the purge device 117, which comprises a purge outlet 118; the control unit controlling the motorized valve 125 is configured to obtain a temperature of between 195K and 220K at the measurement point of the primary-fluid temperature-measurement device 126, so that the carbon dioxide ($CO_2$) contained in the primary fluid can be separated from the primary fluid using the purge device 127, which comprises a purge outlet 128, and the control unit controlling the motorized valve 135 is configured to obtain a temperature of between 77K and 96K at the measurement point of the primary-fluid temperature-measurement device 136 so that oxygen (or more accurately dioxygen) in liquid form ($LO_2$) contained in the primary fluid can be separated from the primary fluid using the purge device 137, which comprises a purge outlet 138. According to this embodiment, nitrogen is then available at the outlet 139 of the inert-gas generation system. Advantageously, all or some of this nitrogen is transferred into the available space of one or more hydrogen systems, so as to fill this or these spaces with inert gas and consequently reduce the flammability of the contents of this or these systems. According to this embodiment, three successive cooling operations executed by the heat exchangers 110, 120 and 130 therefore make it possible to obtain nitrogen at the outlet 139 of the inert-gas generation system. Advantageously and judiciously, the use of the liquid hydrogen for generating inert gas in the inert-gas generation system 10 makes it possible both to meet a need to warm the liquid hydrogen so that it can be used on board the aircraft, for example in a fuel cell, and the need to cool the compressed hot air in order to execute fractional distillation yielding an inert gas such as nitrogen.

Figure 1B:
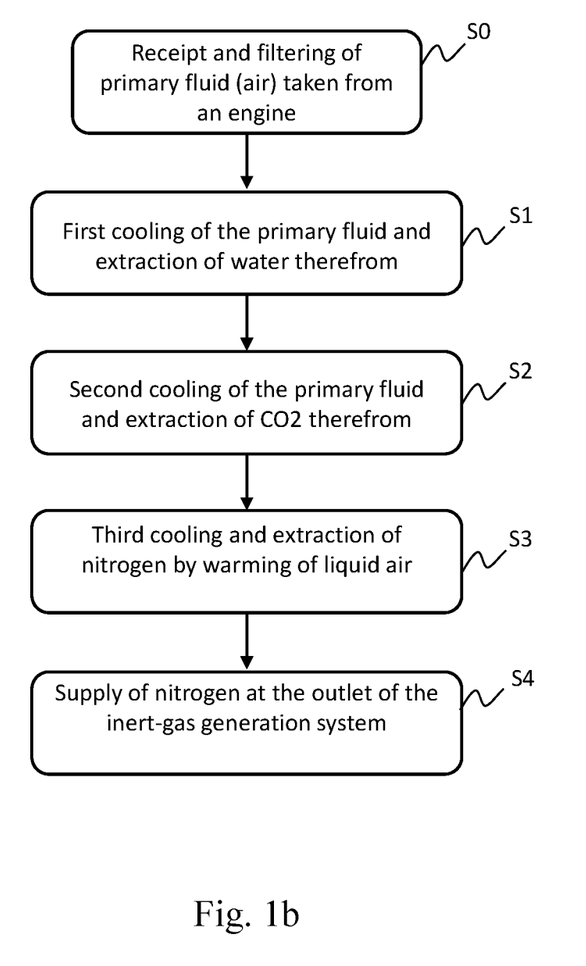

FIG. 1b is a diagram illustrating a method for generating nitrogen in the inert-gas generation system 10.

During a step S0, compressed air, taken from one or more engines of the aircraft carrying the inert-gas generation system 10 and at a pressure in excess of 6 bar, is received at the inlet 100 of the system 10. The compressed air is then filtered by the filter 101. A first cooling of this air, also referred to here as primary fluid, is executed during a step S1 in the heat exchanger 110 of which the inlet pipeline, a portion of the primary pipeline 102, is connected to the outlet of the filter 101. This cooling of the primary fluid is executed using liquid hydrogen which passes through the secondary pipeline of the heat exchanger 110. The flow rate of liquid hydrogen in this secondary pipeline is controlled by the motorized valve 115 so that, still during step S1, an extraction of water can be performed by the purge device 117. The water is condensed by keeping the temperature at the outlet of the primary pipeline 102 associated with the heat exchanger 110 at a temperature below 430K. The condensed water is extracted from the primary pipeline 102 via the outlet 118 of the purge device 117, after which the primary fluid, rid of water, is conveyed into the portion of primary pipeline 102 associated with the heat exchanger 120. A second cooling of the primary fluid is then executed during a step S2 using, once again, liquid hydrogen as coolant. In this heat exchanger, the primary fluid, which is to say, the compressed and filtered air introduced into the system 10, now rid of water, is cooled so that its temperature at the outlet of the portion of primary pipeline 102 associated with the heat exchanger 120 is comprised between 195K and 220K, making it possible to obtain the carbon dioxide contained in the primary fluid in liquid form. This carbon dioxide in liquid form is then extracted from the primary fluid via the outlet 128 of the purge device 127, still during step S2. The primary fluid at this stage is the rest of the compressed air introduced at the inlet of the system, following the extraction of the water and the carbon dioxide. It is conveyed in this form to the heat exchanger 130 where it is subjected, during a step S3, to a third cooling using liquid hydrogen, so that its temperature at the outlet of the portion of primary pipe 102 associated with the heat exchanger 130 is comprised between 77K and 96K. At this temperature, the oxygen (or more accurately the dioxygen) is present in the primary fluid in liquid form and is extracted, still during step S3, via the outlet 138 of the purge device 137. The primary fluid available in the primary pipeline 102 at the outlet 139 of the purge device 137 is then supplied, during a step S4, to the outlet of the inert-gas generation system 10, in the form of nitrogen in the gaseous state. Advantageously this can be used for its non-flammability properties in one or more hydrogen systems of an aircraft carrying the inert-gas generation system 10 or else can be put to use somewhere else in the aircraft where its inert-gas properties can be put to beneficial use.

Figure 2A:
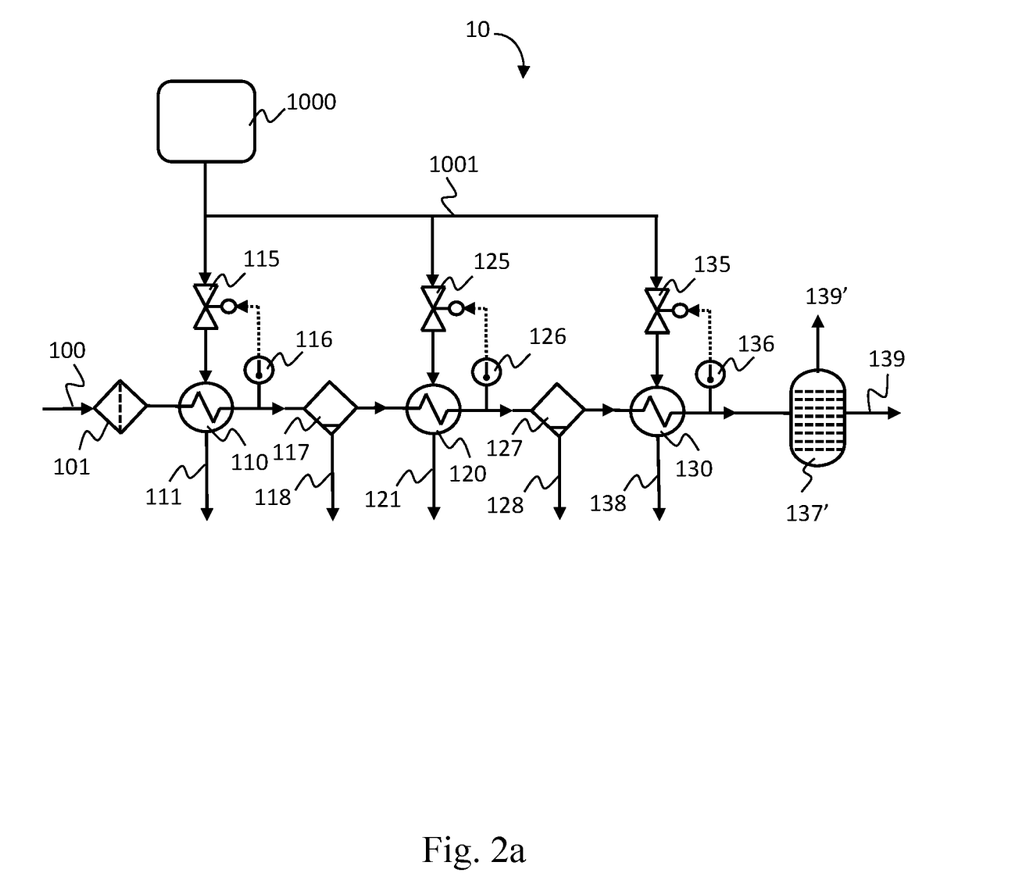

FIG. 2a schematically depicts a first variant of the inert-gas generation system 10 as previously described in relation to FIG. 1a. This first variant of the system 10 comprises numerous elements in common with the inert-gas generation system described in FIG. 1a. Thus, the heat exchangers 110, 120 and 130, and the motorized valves 115, 125 and 135 and the temperature-control devices 116, 126 and 136 are arranged in the same way as in the system as described in connection with FIG. 1a. The same is true of the inlet 100, the inlet filter 101, the pipeline 102 and the liquid-hydrogen tank 1000 and the pipeline 1001 for distributing liquid hydrogen to the heat exchangers 110, 120 and 130 via the motorized valves 115, 125 and 135 respectively. However, in this variant, the part of the system downstream of the heat exchanger 130 is arranged differently so that the purge device 137 is replaced by a device 137' for heating the primary fluid which comprises two outlets 139 and 139' and so that the control of the motorized valve 135, which valve is configured for regulating the temperature of the primary fluid at the outlet of the portion of primary pipeline 102 associated with the heat exchanger 130, is adapted so that the primary fluid has a temperature of between 63K and 77K at this point, which is to say, so that it is in the form of liquid air. The inlet of the heating device 137' is connected to the portion of primary pipeline 102 leaving the heat exchanger 130. A warming of the liquid air thus obtained, within the heating device 137', allows the nitrogen to be extracted in gaseous form at the outlet 139' of the heating device 137' so that nitrogen-impoverished air can be supplied at the outlet 139 of the inert-gas generation system 10.

Figure 2B:
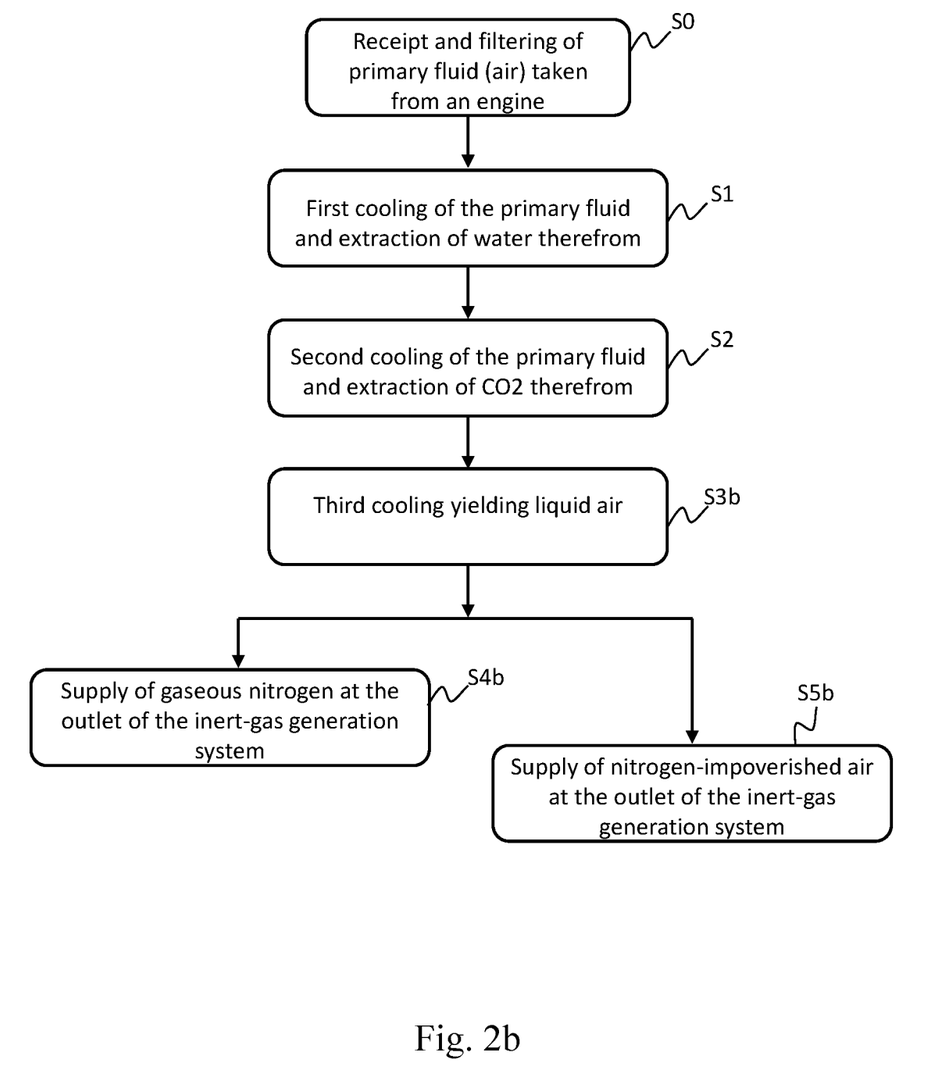

FIG. 2b is a diagram illustrating a method for generating nitrogen, in gaseous form, in the inert-gas generation system 10 arranged according to the first variant embodiment described hereinabove. Steps S0, S1 and S2 remain unchanged in comparison with the method described with reference to FIG. 1b, which is to say, the two first steps of separating components of the primary fluid, which are respectively aimed at extracting the water and the carbon dioxide (also referred to as CO2 gas) from the primary fluid, are performed in the same way as in the method described in connection with FIG. 1b. However, in this variant and after the step of extracting the carbon dioxide, the cooling of the primary fluid that is executed in the heat exchanger 130 is designed so that the primary fluid has a temperature of between 63K and 77K so that, during a step S3b, air in liquid form is obtained and so that, during a step S4b, nitrogen in gaseous form is extracted from the primary fluid to be made available at the outlet 139' of the system 10, and nitrogen-impoverished air can be made available at the outlet 139 of the system 10 in a step S5b.

Figure 3A:
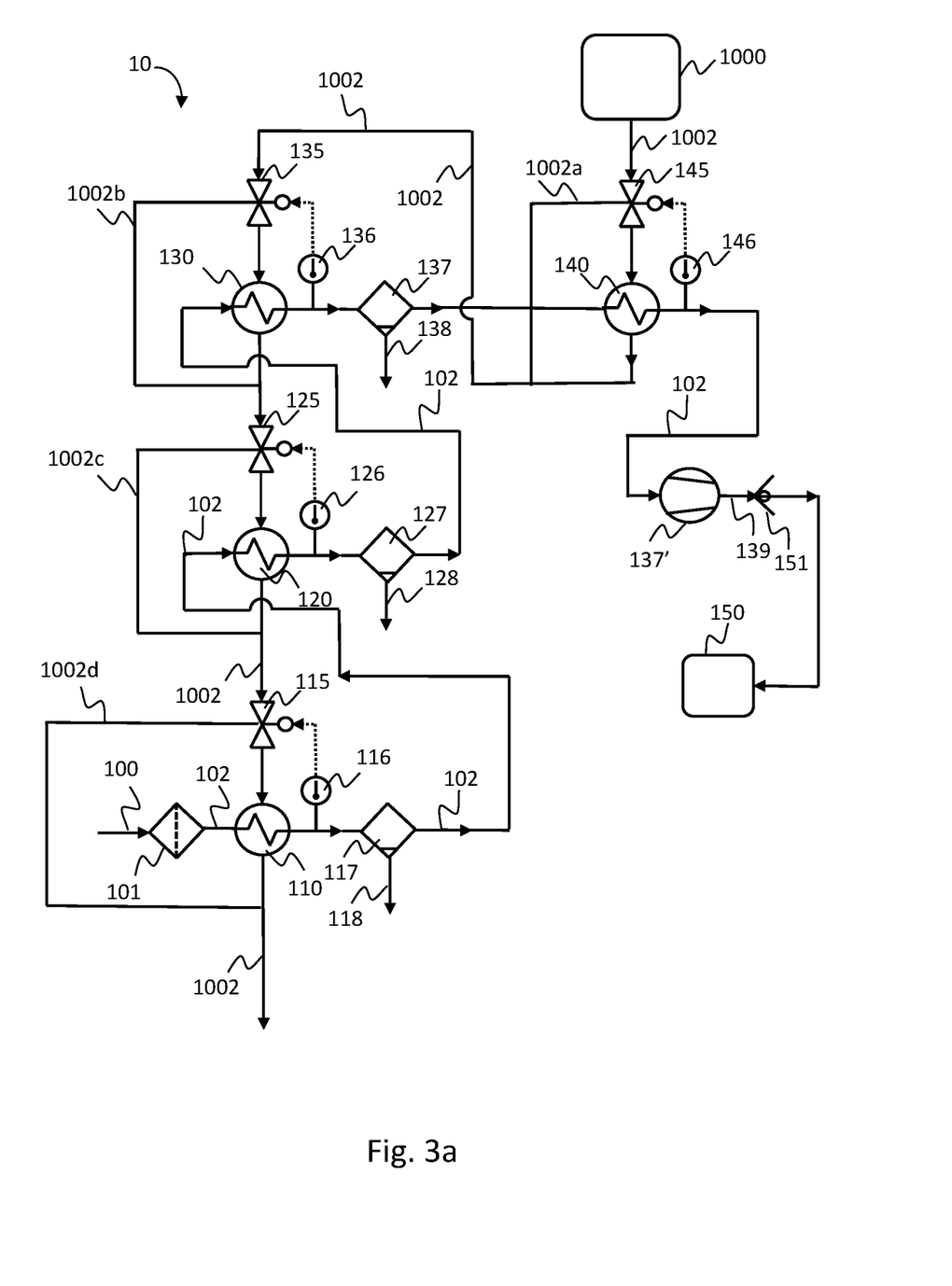

FIG. 3a schematically depicts a second variant embodiment of the inert-gas generation system 10 as already described in connection with FIG. 1a. In this variant, the various heat exchangers used are not connected to the liquid-hydrogen tank 1000 in parallel via the pipeline 1001, as in the embodiment variants described in connection with FIG. 1a and FIG. 2a. In this second variant, the secondary pipelines of the heat exchangers 110, 120 and 130, through which pipelines the liquid hydrogen used for cooling the primary fluid circulates, are arranged in series. Furthermore, a fourth heat exchanger 140 is used downstream of the heat exchanger 130 on the primary pipeline 102 to liquefy the nitrogen obtained at the outlet of the portion of primary pipeline 102 associated with the heat exchanger 130. At this point, a temperature-control device 146, configured to operate a motorized valve 145, allows regulation of the temperature of the primary fluid. According to this embodiment variant, the outlet of the portion of primary pipeline 102 associated with the heat exchanger 140 is connected to a pump 137" the outlet of which is connected to a liquid-nitrogen storage tank 150 via a non-return valve 151 positioned at the outlet 139 of the inert-gas generation system 10.

In this variant, the liquid hydrogen stored in the liquid-hydrogen tank 1000 passes through a secondary distribution pipeline 1002. The secondary hydrogen-distribution pipeline 1002 passes in succession through the motorized valve 145 (used for regulating the temperature of the primary fluid at the outlet of the primary pipeline 102 of the heat exchanger 140) and the portion of secondary pipeline 1002 associated with the heat exchanger 140, and then the motorized valve 135 (for regulating the temperature of the primary fluid at the outlet of the primary pipeline 102 associated with the heat exchanger 130), the portion of secondary pipeline 1002 associated with the heat exchanger 130, and then the motorized valve 125 (used for regulating the temperature of the primary fluid at the outlet of the primary pipeline 102 associated with the heat exchanger 120) and the portion of secondary pipeline 102 associated with the heat exchanger 120, and then finally the motorized valve 115 (for regulating the temperature of the primary fluid at the outlet of the primary pipeline 102 associated with the heat exchanger 110) and the portion of secondary pipeline 1002 associated with the heat exchanger 110. Each of these motorized valves 135, 125 and 115 is associated with a so-called "bypass" pipeline allowing the portion or portions of secondary pipeline 1002 downstream (and therefore the valve or valves arranged downstream on the secondary pipeline 1002) to be fed with fluid when the valve that it bypasses is configured to allow hydrogen to pass only at a limited flow rate with a view to regulating the temperature at the outlet of the primary pipeline of an exchanger. Thus, a "bypass" portion 1002a of the secondary pipeline is designed to bypass the heat exchanger 140 when the motorized valve 145 is configured to limit the flow rate of hydrogen distributed in the secondary pipeline 1002, a "bypass" portion 1002b of secondary pipeline is designed to bypass the heat exchanger 130 when the motorized valve 135 is configured to limit the flow rate of hydrogen distributed in the secondary pipeline 1002, a "bypass" portion 1002c of secondary pipeline is designed to bypass the heat exchanger 120 when the motorized valve 125 is configured to limit the flow rate of hydrogen distributed to the secondary pipeline 1002, and a "bypass" portion 1002d of secondary pipeline is designed to bypass the heat exchanger 110 when the motorized valve 115 is configured to limit the flow rate of hydrogen distributed in the secondary pipeline 1002.

Such an arrangement of the exchangers 140, 130, 120 and 110, arranged in series on the hydrogen distribution pipeline 1002, so as to sequentially execute successive cooling operations in these exchangers, advantageously allows the hydrogen initially stored at a temperature of 20K to be warmed up progressively as it successively passes through the various portions of the secondary pipeline 1002 so that it can be used later on board the aircraft, for example in a fuel cell. Advantageously, the exchanger positioned furthest upstream on the distribution pipeline 1002 is the one at which the lowest temperature is required to execute cooling of the primary fluid, and so on.

Figure 3B:
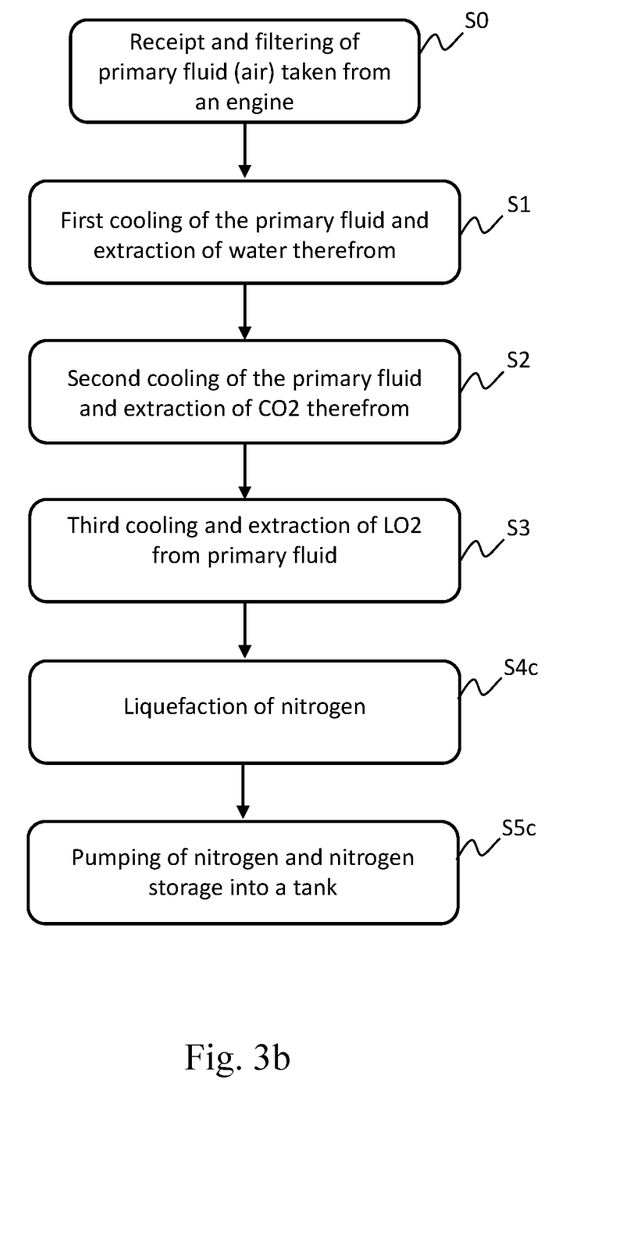

FIG. 3b is a diagram illustrating a method for generating nitrogen, in aqueous form, in the inert-gas generation system 10 arranged according to the second variant embodiment described above. The steps S0, S1, S2 and S3 are similar to those described previously according to the embodiment or variant described in relation to FIG. 1a and FIG. 1b. That means to say that the operations of filtering, of separating components of the primary fluid with a view to extracting the water from the primary fluid, then the carbon dioxide, then the oxygen in liquid form, are similar to what was described earlier. Thus, the temperatures of portions of primary pipeline 102 at the measurement point at which the temperature measurement devices 116, 126 and 136 are located are identical to those described hereinabove in the method in relation to FIG. 1a. However, the temperature of the primary fluid is regulated at the outlet of the portion of primary pipeline 102 associated with the heat exchanger 140 in order there to obtain nitrogen in liquid form in a step S4c, which nitrogen is then pumped by the pump 137" before being stored in the nitrogen tank 150 in a step S5c.

Figure 4A:
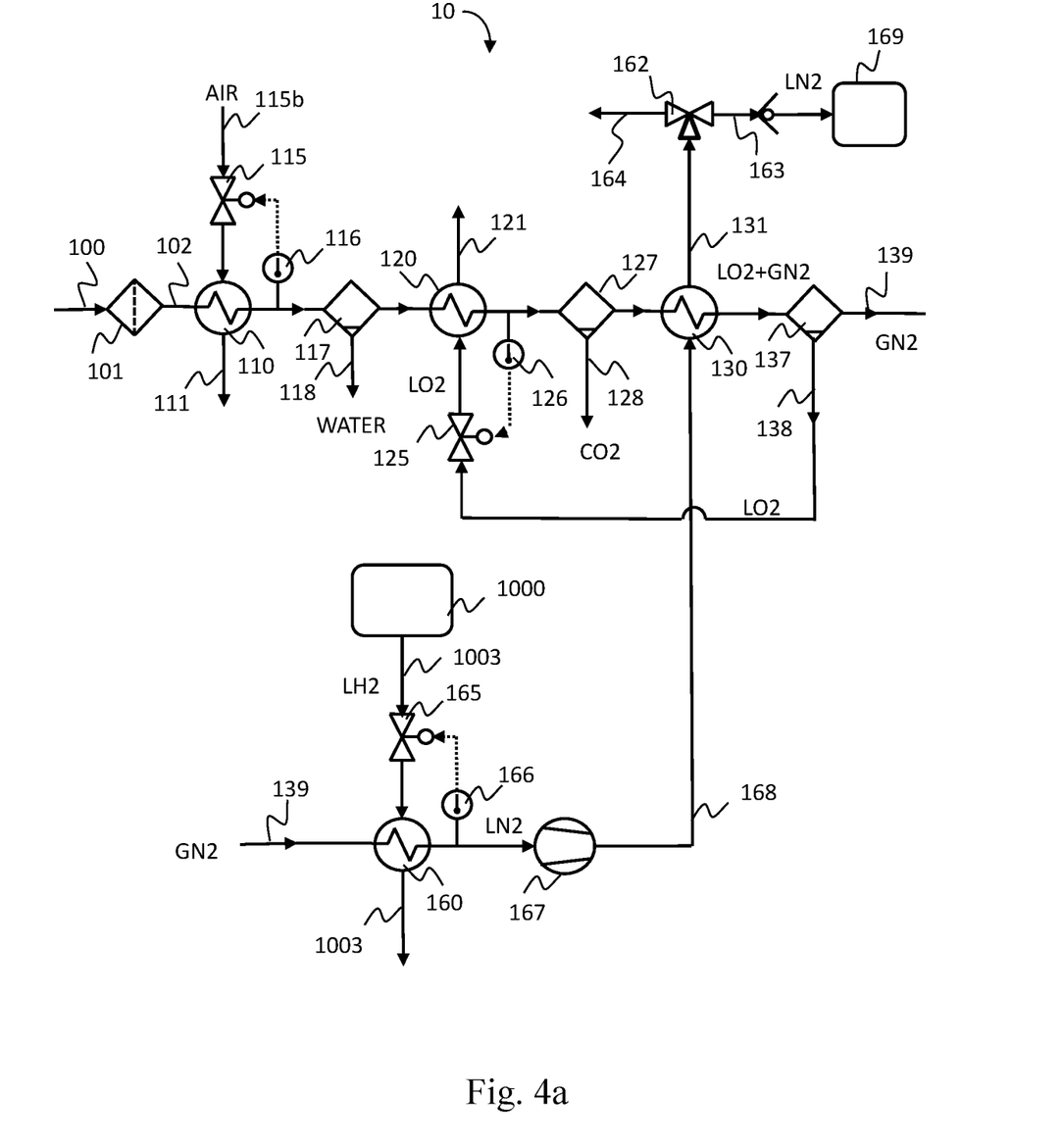

FIG. 4a schematically depicts a third variant embodiment of the inert-gas generation system already described in connection with FIG. 1a. According to this embodiment variant, the portions of secondary pipeline associated with the various heat exchangers 110, 120, 130 and 140 successively used to participate in fractional distillation of the compressed air, which is to say, the portions of pipeline through each of which a fluid that is to cool, by exchange of heat, the primary fluid present in the primary pipeline 102 passes, are connected to different sources of refrigerant. According to this variant embodiment, the inlet 115b of the motorized valve 115 is connected to an ambient-air inlet (identified as "AIR" in FIG. 4a), the inlet of the motorized valve 125 is connected to the outlet 138 of the purge device 137, configured to extract oxygen in the liquid state (identified as "LO2" in FIG. 4a) from the primary fluid downstream of the heat exchanger 130, and the inlet of a motorized valve 165 configured to regulate the temperature of the primary fluid obtained from the outlet 139 of the system 10, in collaboration with a heat exchanger 160, is connected to the hydrogen tank 1000 (identified as "LH2" in FIG. 4a) by a distribution pipeline 1003. An outlet 121 of the secondary pipeline associated with the heat exchanger 120 allows the liquid oxygen used as a coolant in the heat exchanger 120 to be directed onwards, with a view to potential subsequent use, for example in a fuel cell carried onboard the aircraft. The temperature at the outlet of the portion of primary pipeline 102 associated with the heat exchanger 160 is controlled via the motorized valve 165 which is controlled on the basis of a temperature-measurement device 166.

Furthermore, the portion of secondary pipeline associated with the heat exchanger 130 is connected to the outlet 168 of a pump 167 configured to pump the primary fluid in the form of liquid nitrogen (identified as "LN2" in FIG. 4a) available at the outlet of the heat exchanger 160 along the primary pipeline 102, downstream of the heat exchanger 160 designed to control the temperature of the primary fluid taken from the outlet 139. The pump 167 thus allows nitrogen in the liquid state to be pumped in the portion of secondary pipeline associated with the heat exchanger 130 so as to cool the primary fluid, and then allows this liquid nitrogen to be stored in a tank 169, by way of a pipeline 163 comprising a nonreturn valve.

A motorized and controlled two-outlet valve 162 allows the nitrogen still in the gaseous state before being completely cooled to be directed from an outlet 131 of the portion of secondary pipeline associated with the heat exchanger 130 towards an outlet 164 when the system is started up, and then allows nitrogen in the liquid state to be directed towards the liquid-nitrogen tank 169 when the system is operating under nominal conditions. The directional valve 162 is controlled by a controller which has not been depicted in the figure, which is suitable for determining the state of the primary fluid at various points of the system 10, by temperatures taken by temperature-measuring devices. Thus, the successive operations of separating components of the primary fluid can be carried out by obtaining suitable temperatures in the various portions of the primary pipeline 102 and fluids, the proximity of which could be detrimental to safety if an element of the system should leak or break, are advantageously kept away from one another. Advantageously, the liquid oxygen extracted at the outlet 138 of the purge device 137 could be used to operate one or more fuel cells used in the aircraft.

Figure 4B:
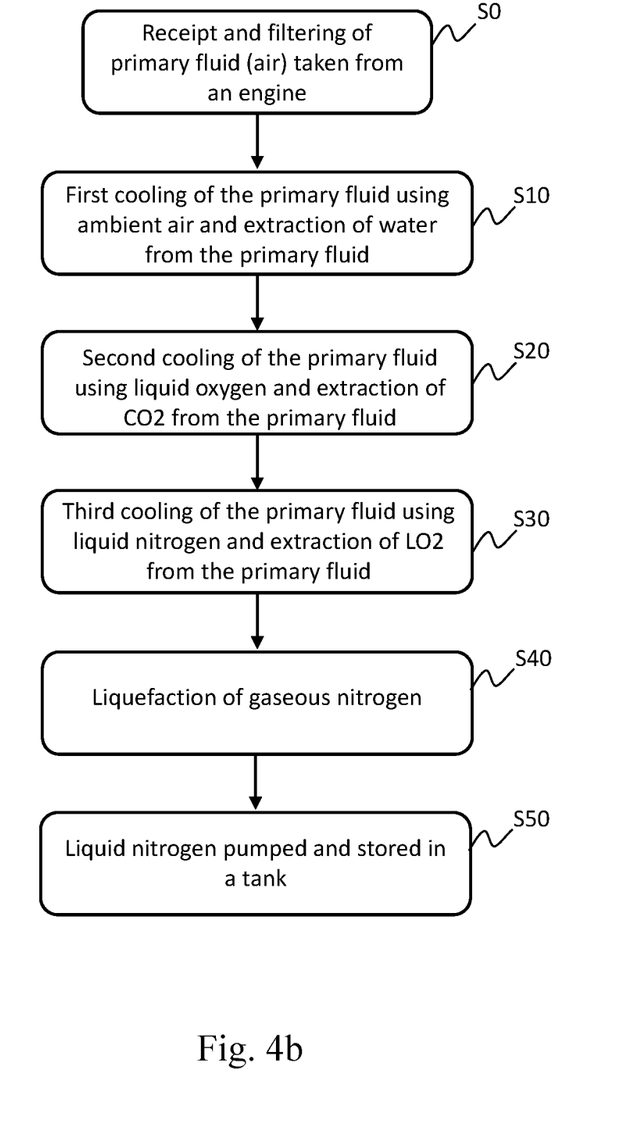

FIG. 4b is a diagram illustrating a method for generating nitrogen, in liquid form, in the inert-gas generation system 10 arranged according to the third variant embodiment described hereinabove. In the inert-gas generation system 10 arranged according to this third variant, the step S0 of filtering the compressed air conveyed to the inlet of the system 10 remains unchanged in comparison with the variants described previously. Then, in a way similar to that executed in the method described in connection with FIG. 1b, a cooling of the primary fluid is executed during a step S10 in order to extract the water from the primary fluid, downstream of the heat exchanger 110. In this third variant of the method, this first cooling of the primary fluid is carried out using ambient air taken from outside the aircraft carrying the inert-gas generation system 10. The ambient air is introduced for this purpose into the portion of secondary pipeline associated with the heat exchanger 110 after its flow rate through this pipeline has been regulated by the motorized valve 115. The ambient air is then recovered via an outlet 111 of the secondary pipeline associated with the heat exchanger 110 so as possibly to be used somewhere else in the aircraft. A second cooling of the primary fluid is then executed during a step S20, using in the heat exchanger 120 liquid oxygen collected from the outlet 138 of the purge device 137. Thus, judiciously, a fluid extracted from the primary fluid during one step of fractional distillation for generating an inert gas is used as a refrigerant in another step of the fractional distillation. A third cooling of the primary fluid is then executed in a step S30, in the heat exchanger 130, using liquid nitrogen obtained from a fourth cooling of the primary fluid, which cooling is executed during a step S40 aimed at liquefying the nitrogen available in the gaseous state in the outlet pipeline 139. This fourth cooling of the primary fluid is executed using liquid hydrogen from the hydrogen tank 1000, used as coolant in the heat exchanger 160. The liquid nitrogen thus obtained is then pumped into and stored in the liquid-nitrogen tank 169, during a step S50.

Figure 5A:
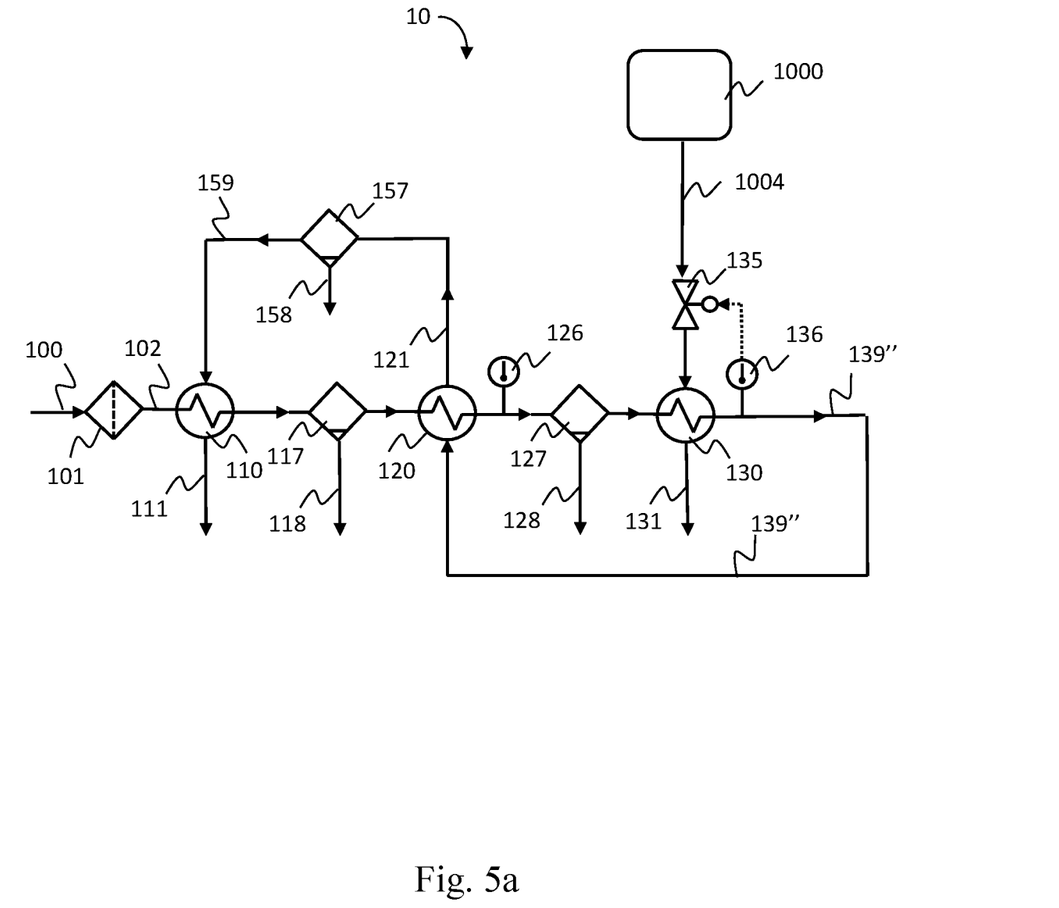

FIG. 5a schematically depicts a fourth variant embodiment of the inert-gas generation system 10 already depicted in FIG. 1a. In this fourth variant, the first cooling of the primary fluid introduced into the inlet 100 of the system 10 and then filtered in the filter 101 as it enters the primary pipeline 102 is carried out in the heat exchanger 110 using nitrogen in the gaseous state. The nitrogen in the gaseous state that is used for this first cooling is obtained by extracting liquid oxygen from the primary fluid in a purge device 157. The primary fluid rid of liquid oxygen is conveyed towards the portion of secondary pipeline associated with the exchanger 110 via a pipeline 159. The liquid oxygen is extracted via a purge outlet 158 of the purge device 157 and the residual gaseous nitrogen is conveyed via a pipeline 159 from the purge device 157 to the portion of secondary pipeline associated with the exchanger 110. The gaseous nitrogen used as a coolant in the heat exchanger 110 is then available at the outlet 111 of the heat exchanger 110 for use as an inert gas. Once again, the liquid oxygen can be used to operate a fuel cell carried onboard the aircraft.

According to this variant embodiment, the inlet of the portion of secondary pipeline associated with the heat exchanger 120, used for cooling the primary fluid with a view to extracting the carbon dioxide, is connected to the outlet of the primary pipeline associated with the heat exchanger 130, which is used here for obtaining liquid air by cooling the primary fluid, after the successive extraction of the water and of the carbon dioxide, which extraction operations are executed respectively in the purge devices 117 and 127. The cooling executed in the exchanger 130 is executed using liquid hydrogen, taken from the liquid-hydrogen tank 1000 via a pipeline 1004 and then via the motorized valve 135 which passes into the portion of secondary pipeline associated with the heat exchanger 130. The motorized valve 135 that regulates the flow rate of the liquid hydrogen in the portion of secondary pipe associated with the heat exchanger 130 is controlled on the basis of a temperature measured by the primary-fluid temperature-measuring device 136 arranged at the outlet of the portion of primary pipeline 102 associated with the heat exchanger 130. The flow of liquid air is transmitted between the outlet of the primary pipeline associated with the heat exchanger 130 and the inlet of the secondary pipeline associated with the heat exchanger 120 through a pipeline 139".

Figure 5B:
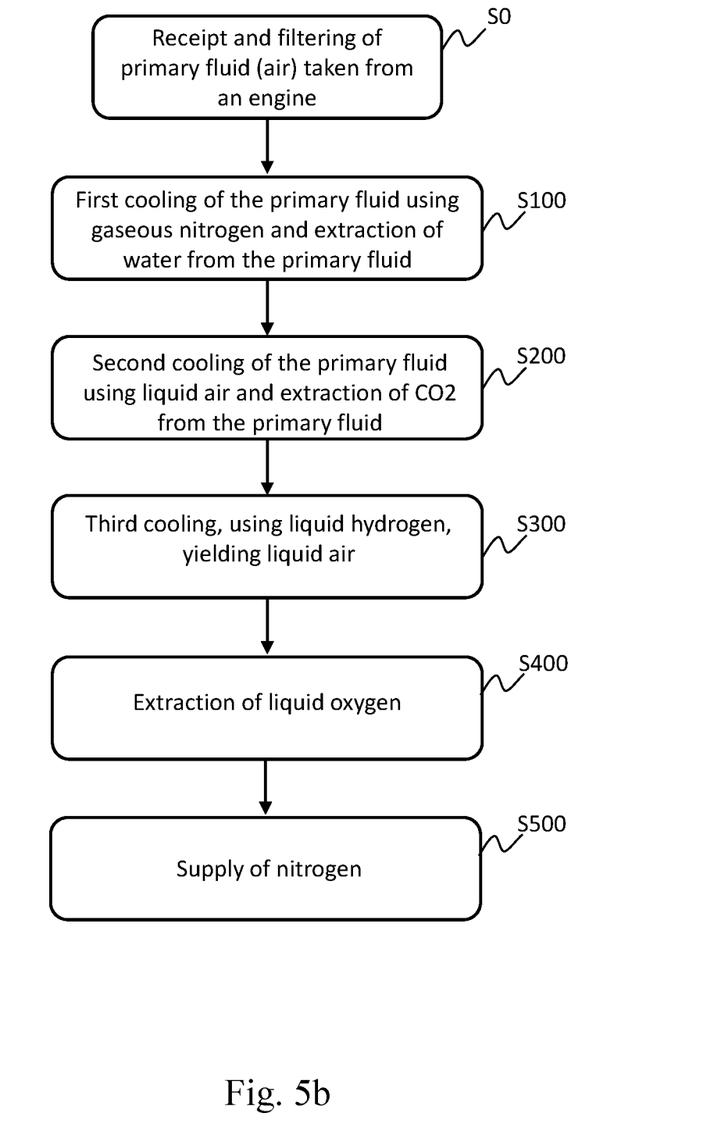

FIG. 5b is a diagram illustrating a method for generating nitrogen, in gaseous form, in the inert-gas generation system 10 arranged according to the fourth variant embodiment described above.

The step S0 of receiving compressed air in the system 10 and of filtering this air is still identical to the step S0 executed in the other variants. Then, in this variant, the first cooling of the primary fluid is executed in a step S100 using gaseous nitrogen obtained by the extraction of liquid oxygen during a step S400 from liquid air used as a coolant in the second cooling of the primary fluid, which is executed in a step S200. This liquid air is itself obtained after a third cooling of the primary fluid, in the heat exchanger 130 and during a step S300, using liquid nitrogen. After the water and the carbon dioxide have been extracted, liquid air has been obtained and liquid oxygen has been extracted from the primary fluid, the nitrogen in the gaseous state is then available at the outlet 111 of the heat exchanger 110.

Figure 6:
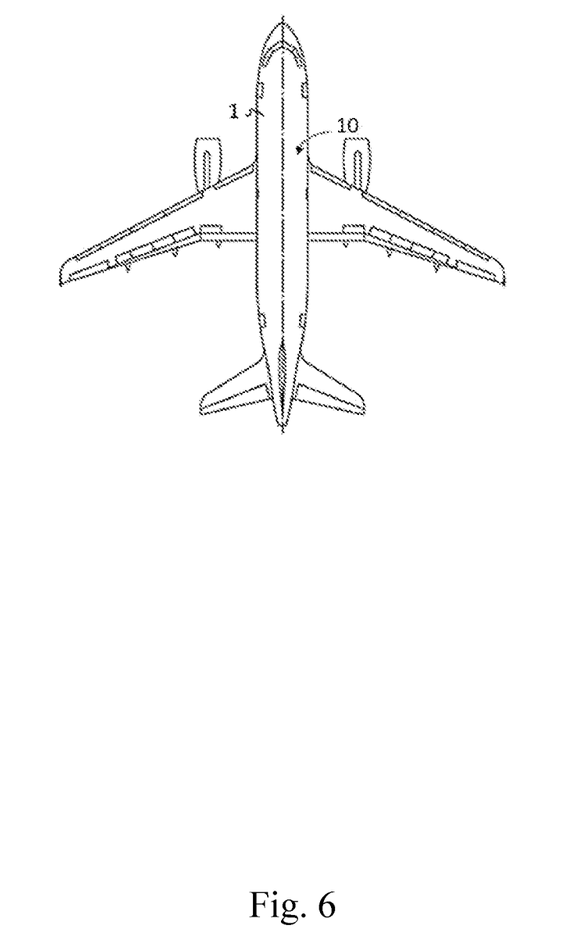

FIG. 6 depicts an aircraft 1 comprising the inert-gas generation system 10 according to one of the embodiment variants described hereinabove. The use of such an inert-gas generating system is particularly advantageous on board an aircraft in as much as the hydrogen stored at a temperature of 20K in one or more tanks needs to be warmed in order to be able to be used in a fuel cell, and its initial temperature allows it to successively cool compressed hot air so that fractional distillation operations can be performed and an inert gas such as nitrogen generated in order to reduce the flammability of the contents of certain parts of the hydrogen-distribution system.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for generating an inert fluid in an aircraft having a tank of liquid hydrogen, from a primary fluid initially collected from compressed hot air, the primary fluid comprising, as components, water, carbon dioxide, dioxygen, and nitrogen, the method comprising:
- a first step of separating components of said primary fluid by cooling said primary fluid to extract water from said primary fluid in liquid form,
- a second step of separating components of said primary fluid by cooling said primary fluid to extract carbon dioxide from said primary fluid in liquid form,
- a third step of separating components of the primary fluid, by cooling said primary fluid after said second step to extract dioxygen from said primary fluid in liquid form,
- a step of liquefying said primary fluid after said third step of separating components to form liquid nitrogen by cooling the primary fluid with the liquid hydrogen, and followed by a step of pumping said liquid nitrogen towards a tank,
- wherein the first step of separating components of said primary fluid comprises cooling of the primary fluid in a first heat exchanger using ambient air;
- wherein the second step of the separating components of the primary fluid comprises cooling of the primary fluid in a second heat exchanger with said dioxygen extracted during the third step;
  - wherein the third step of separating components of the primary fluid comprises a cooling of the primary fluid using said liquid nitrogen;
- wherein the first step of separating components, the second step of separating components, and the third step of separating components of said primary fluid occur by a change of a phase of a component of the primary fluid.

2. The method for generating an inert fluid according to claim 1, further comprising:
- a step of liquefying said primary fluid, after said first step and said second step, and followed by
- a step of warming said liquefied primary fluid, suitable for extracting nitrogen in gaseous form.

3. The method for generating an inert fluid according to claim 1, wherein the successive steps of separating components of said primary fluid, by cooling said primary fluid, each use a heat exchanger, the heat exchangers used being fed in parallel, each via a motorized valve, from a liquid-hydrogen tank of the aircraft.

4. The method for generating an inert fluid according to claim 1, wherein the successive steps of separating components of said primary fluid, by cooling said primary fluid, each use a heat exchanger, the heat exchangers being arranged in series so that the liquid hydrogen used at an inlet of a heat exchanger for cooling said primary fluid during a component-separating step comes at least in part from an outlet of another heat exchanger used for cooling said primary fluid in another step of separating components of said primary fluid.

5. The method for generating an inert fluid according to claim 1, further comprising:
- a step of liquefying said primary fluid, after said first step and second step,
- wherein the first step and second step of separating components of the primary fluid each comprise a cooling of the primary fluid in a heat exchanger by means of the liquefied primary fluid, and
- wherein said step of liquefying the primary fluid comprises a cooling of the primary fluid in a heat exchanger by means of said liquid hydrogen.

6. The method of claim 1, wherein the first step of separating components, the second step of separating components, and the third step of separating components of said primary fluid do not utilize a membrane for separation of the primary fluid.

* * * * *